Oct. 12, 1965   W. KOHLHAGEN   3,211,933
SELF-STARTING SYNCHRONOUS MOTOR
Filed March 9, 1962
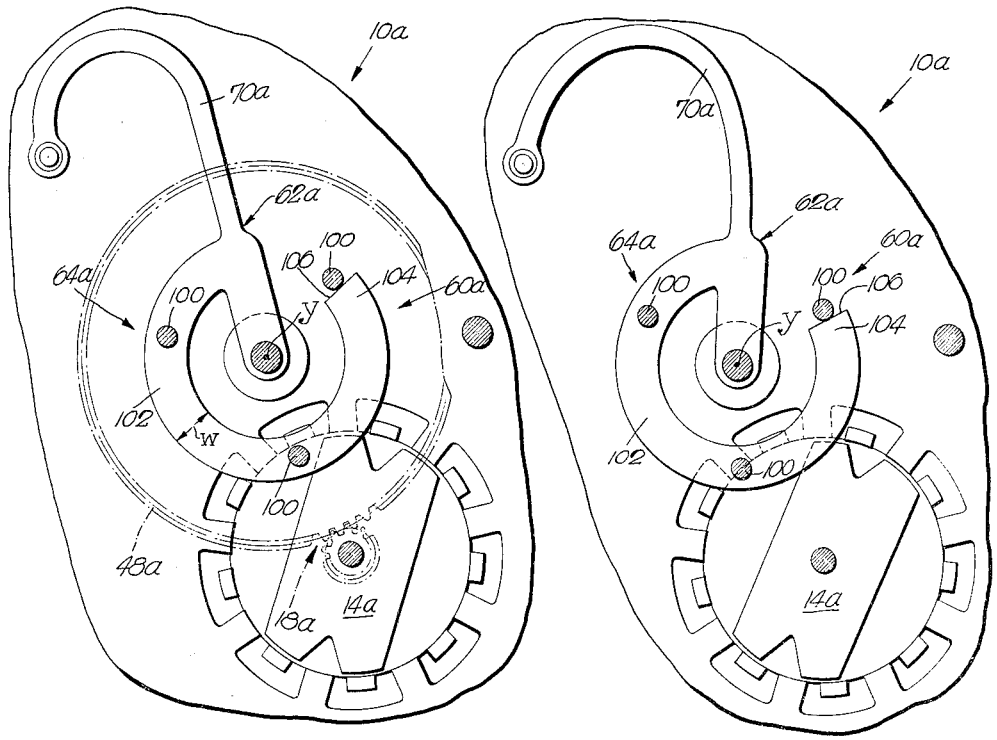
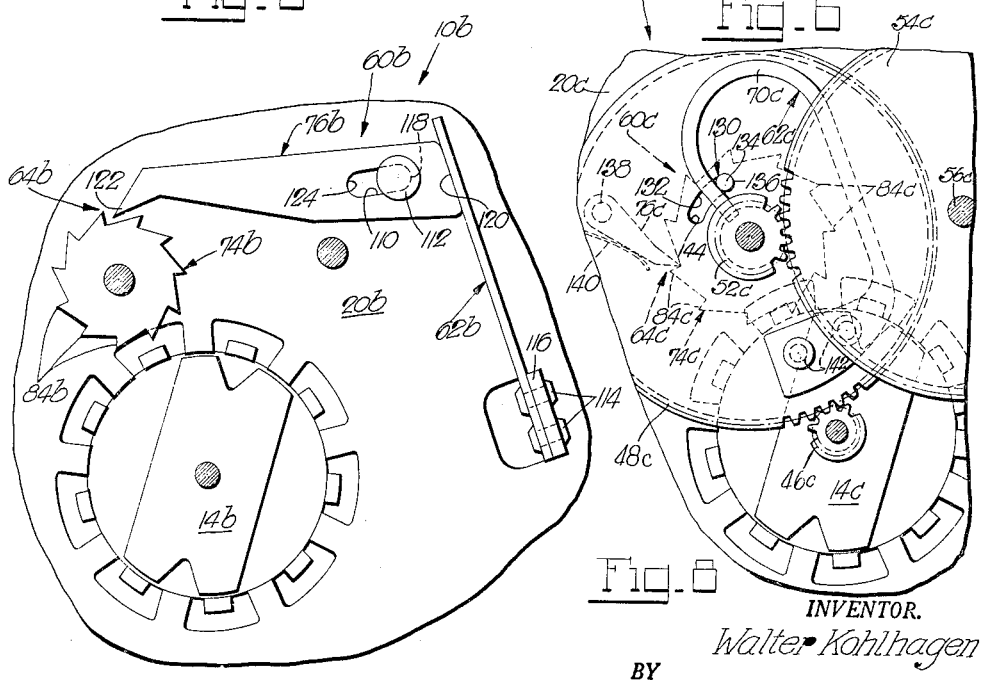
INVENTOR.
Walter Kohlhagen
BY
Attorney.

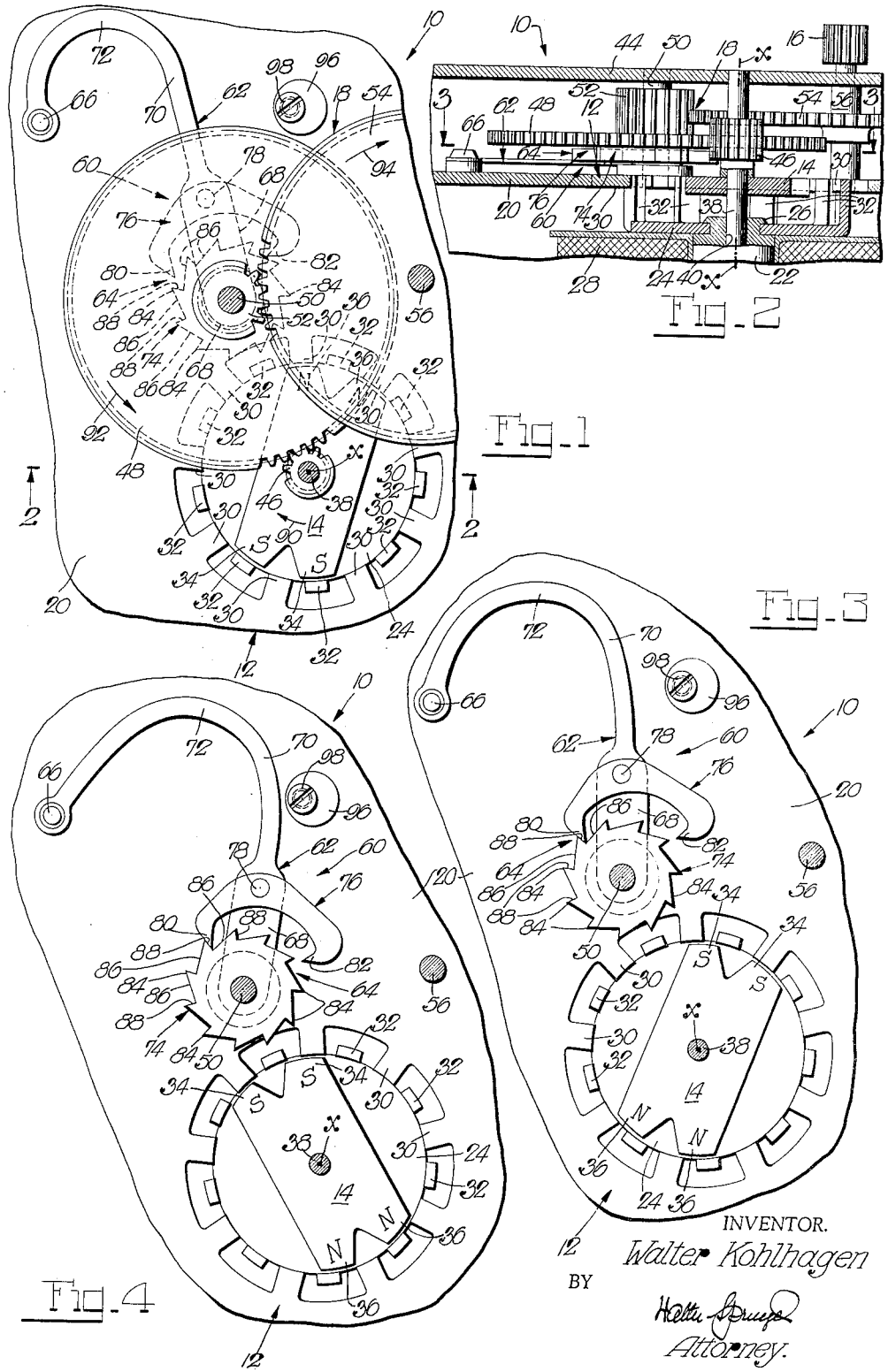

Oct. 12, 1965   W. KOHLHAGEN   3,211,933
SELF-STARTING SYNCHRONOUS MOTOR
Filed March 9, 1962

INVENTOR.
Walter Kohlhagen
BY
Attorney.

United States Patent Office 3,211,933
Patented Oct. 12, 1965

3,211,933
SELF-STARTING SYNCHRONOUS MOTOR
Walter Kohlhagen, 818 Oakley Ave., Elgin, Ill.
Filed Mar. 9, 1962, Ser. No. 178,687
18 Claims. (Cl. 310—48)

This invention relates to synchronous motors in general, and to directional drive control for self-starting synchronous motors in particular.

Motors of this kind have a multi-polar field of which alternate poles are of opposite polarity at any given instant and change their polarities in phase with an alternating current supplied to an associated field coil, and a permanent-magnet rotor the poles of which cooperate with the field poles in stepping the rotor in synchronism with the alternation of the current. These motors will generally self-start when on the first or subsequent polarization of the field poles the rotor becomes unstable in any idle position and soon takes off in either direction. Since for most applications the motors are required to run in a certain direction, they are provided with a directional drive control which permits the rotor to start in either direction and causes the same to reverse into the right direction on each start in the wrong direction. Such a directional drive control is customarily a one-way clutch in the rotor to output pinion drive of a motor, with one of the companion members of the clutch being in many cases a spring element for structural simplicity and low cost of the clutch and also for providing in the clutch some resiliency to cushion its closure on impact with a wrong-directionally started rotor. However, while these prior spring-type drive controls are generally satisfactory, they are sometimes deficient, and even fail, in their performance in motors of which the loads, and particularly heavy loads, thereon back up when not driven. Thus, performance deficiency and even failure of these prior drive controls is frequently due to their characteristic that regardless of the starting direction of the rotor they rely largely on the rotor torque to overcome the entire, or nearly entire, motor load, and it is this load obstacle which most frequently unreasonably delays the rotor drive in the right direction or even stalls the rotor under heavier loads. Thus, these prior drive controls, including those of spring-type, act largely as an immovable barrier for a backing motor load on a wrong-directional start of the rotor in order that the motor load may by its rather sudden stop at this barrier and ensuing rebound therefrom be kept in motion and permit the magnetic field forces to yield the rotor and its load in the right direction and into phase with the applied current. This further requires exceptional structural strength of these prior drive controls in order safely to take up the forces which are involved in the back-up of a motor load thereagainst and which are in any event relatively large, and particularly large for heavier motor loads, considering that the drive control suddenly has to take up not only the back-driving motor torque but also the torque of the entire backing motor load. Hence, in order to prevent performance failure of these prior drive controls due to permanent distortion or breakage of parts thereof under rotor and load back-up forces, they are designed with primary regard to having adequate structural strength for this purpose.

It is an object of the present invention to provide for motors of this kind a spring-type directional drive control which, on failure of the torque of a directionally right-starting rotor immediately to drive the backed-up motor load, will almost instantaneously and without fail start the entire motor load and the rotor in the right direction with a spring force equivalent to the maximum or stalling torque of the rotor, and will continue the drive of the load with a spring force which decreases so gradually that the rotor will without load impediment substantially reach stable running condition and then gradually assume the drive of the load. With this arrangement, a motor will in the briefest time interval assuredly self-start and drive a backed-up load of any magnitude which is limited only by the optimum operational running torque of the rotor.

It is another object of the present invention to provide for motors of this kind a directional drive control with a spring against which the motor load backs up when not driven and which opposes a wrong-directional start of the rotor, with the spring having characteristics and being arranged to respond in deflection to increasing torque up to stalling torque of the rotor in the wrong drive direction. With this arrangement, the rotor will on a right-directional start initially encounter no load and then be assisted by the spring in starting the load, and the rotor will assume the load only as gradually as the force of the recovering spring decreases, thus providing very favorable conditions for an immediate self-start of the rotor in the right direction under an even heavy load. However, if under the same conditions the rotor should reverse prior to reaching stable running condition, the backing load will assist, rather than impede, reverse running of the rotor so that the same will almost invariably have reached stable running condition when the load no longer assists its run and, hence, will develop sufficient torque to further deflect the spring until it reaches stalling torque, whereupon the spring force will not only reverse the rotor and the load but also initially drive both in the right direction for more than sufficient time to permit the rotor to reach stable running condition before or at the time it gradually assumes the load. Finally, should the rotor on a wrong-directional start reverse before appreciably deflecting the spring beyond its deflection under the backed-up motor load, it will simply reverse and most likely on first attempt, but assuredly on second attempt, take off and assume and drive the load. Also, with the spring thus arranged, the parts of the directional drive control may be designed for their structural strength with sole regard to their withstanding the gradually varying forces to which they are subjected by the rotor and its load on a wrong-directional start and, hence, may advantageously be considerably lighter than they would have to be if compelled safely to withstand the sudden and large operational impact forces on the prior drive controls.

It is a further object of the present invention to provide for motors of this kind a directional drive control in which the aforementioned spring is fixedly mounted and, hence, forms no part of the motor drive between the rotor and load, and the spring is operatively connected with a rotor-driven member by a one-way connection or clutch one of the companion elements of which turns with the member and the other element is drivingly connected with the spring, with the one-way connection being operative from the member to the spring and vice versa in the turning direction of the member opposite to and in its normal drive direction, respectively. In thus arranging the directional drive control, the same not only functions in the aforementioned advantageous manner, but is also of exceedingly simple construction and lends itself to efficient and low-cost mass production and assembly. Also, since the spring does not form any part of the motor drive between the rotor and load, the motor drive may advantageously be a positive drive so that the inertia of the entire load will compel the rotor to run uniformly and counteract any tendencies of the same to surge with the turning magnetic circuit in the field. Moreover, the spring, by forming no part of the motor drive, is in its form, dimensions and anchorage not in any way limited by any part of the motor drive and, hence, may in its form, dimensions and anchorage be selected with a sole view to achieving, on the back-up of the load and throughout a backward run of the rotor to its reversal, deflection of the spring in the first place, and especially quite considerable deflection of the same which compels the rotor to turn advantageously through a large angle.

A futher object of the present invention is to provide for motors of this type an alternative drive control in which the companion elements of the aforementioned one-way clutch are fixed and rotary, respectively, and the rotary clutch element is by one-way coupling connected with a rotor-driven member for its drive in one direction on the drive of the member in its normal direction, while the fixed clutch element locks its companion element against rotation in the opposite direction, and the aforementioned spring is carried by the rotor-driven member and drivingly connected with the rotary clutch element, or vice versa, so as yieldingly to oppose the rotor-drive of the member opposite to its normal drive direction. This alternative drive also functions in the aforementioned advantageous manner and also permits the normal motor drive to be advantageously positive despite the arrangement of the spring between driven parts of the drive control.

Another object of the present invention is to provide either of the aforementioned alternative directional motor drive controls with a stop against which a part of the control backs for limiting deflection of the spring beyond, or to less than, its deflection at rotor-stalling torque, thereby to prevent, on stopping the motor, excessive back-up of the motor load, particularly when the load is heavy and has considerable back-up inertia, as well as to hold the maximum stresses of the spring well below the elastic limit to avoid any possible permanent distortion of the spring.

Other objects and advantages will appear to those skilled in the art from the following, considered in conjunction with the accompanying drawings.

In the accompanying drawings, in which certain modes of carrying out the present invention are shown for illustrative purposes:

FIG. 1 is an enlarged fragmentary section through a motor embodying the present invention;

FIG. 2 is a fragmentary section through the motor taken substantially on the line 2—2 of FIG. 1;

FIGS. 3 and 4 are sections similar to FIG. 1 and showing certain parts of the motor in different operating positions;

FIG. 5 is an enlarged fragmentary section through a motor embodying the present invention in a modified manner;

FIG. 6 shows certain parts of the motor of FIG. 5 in different operating positions;

FIG. 7 is an enlarged fragmentary section through a motor embodying the present invention in another modified manner;

FIG. 8 is an enlarged fragmentary section through a motor embodying the present invention in a further modified manner;

Figure 9:
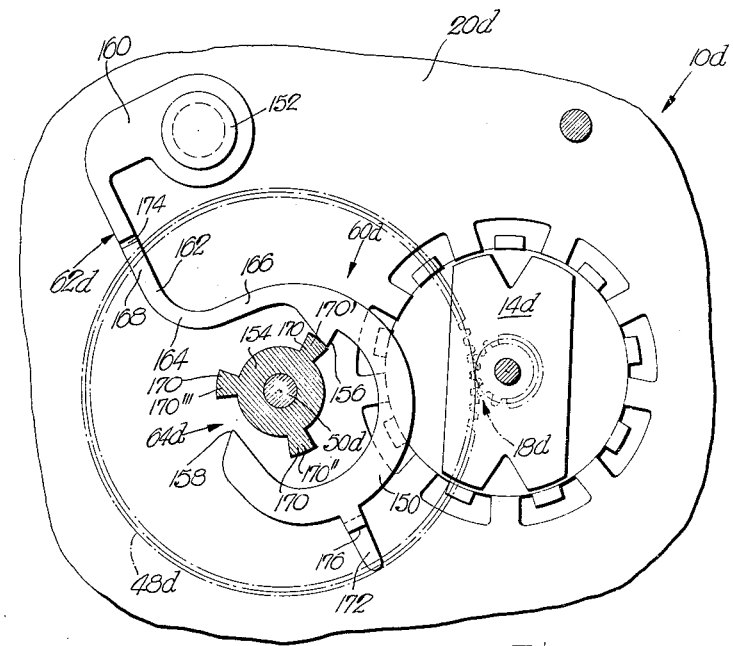
FIG. 9 is an enlarged fragmentary section through a motor embodying the present invention in still another modified manner.

Referring to the drawings, and more particularly to FIGS. 1 to 4 thereof, the reference numeral 10 designates a synchronous motor having a field 12 and a rotor 14, and in the present instance also an output pinion 16 and a speed-reduction drive 18 between the rotor 14 and pinion 16. The field 12 comprises a magnetic field plate 20 which usually is attached to a casing (not shown) that carries a magnetic core 22, another or inner magnetic field plate 24 which at 26 may be staked to the core 22 (FIG. 2), and a field coil 28 surrounding the core 22. The plates 20 and 24 have inner and outer field poles 30 and 32, respectively, which are coordinated with each other and with the rotor axis x in conventional manner.

The rotor 14 is a permanent magnet and has poles 34 and 36 of the respective indicated permanent polarities. The rotor 14 is carried by a shaft 38 which is journalled with one end in a suitable, preferably lubricated, bearing aperture 40 in the core 22, and is in this instance further journalled with its other end in the wall of a gear cover 44 on the field plate 20.

The speed-reduction drive 18 is a gear train which comprises in this instance two reduction stages of which the first stage is formed by a pinion 46 on the rotor shaft 38 and a meshing gear 48 which may be turnable on a fixed staff 50 between the field plate 20 and gear cover 44. The next and final reduction stage is formed by a pinion 52 turning with the gear 48 and a meshing gear 54 on a staff 56 which may be journalled with its ends in the field plate 20 and gear cover 44, and carries the output pinion 16 which is adapted for connection with a load to be driven by the motor.

In operation of the motor, the field poles 30 and 32 will have opposite polarities at any instant, and their polarities will change with the alternation of the current supplied to the field coil 28, with the rotor 14 stepping in phase with the current in well-known manner. The rotor 14 will, on energization of the field coil 28, start and run in either direction, with the rotor becoming unstable in any idle position on the first or subsequent polarization of the field poles 30, 32 and soon taking off in whichever direction it has a predominant urge to go. However, motors of this type are for most applications required to run in one given direction, and are to this end provided with directional drive controls.

The present motor 10 features a directional drive control 60 which comprises a spring member 62 and a one-way drive connection or clutch 64 between the spring member 62 and a rotor-driven member which in this instance is the gear 48 of the train 18. The spring member 62 is in this instance a flat leaf of longitudinal extent which is suitably anchored with one end to the field plate 20 as at 66 and is with its other end anchored on the staff 50, and has a relatively wide and preferably operationally non-flexing length 68 and a widthwise reduced and operationally flexible length 70 part of which is curved at 72. The one-way clutch 64 has companion elements which in this instance are in the form of a ratchetwheel 74 and a cooperating pawl 76. The ratchetwheel 74 turns with the gear 48 of the train 18, while the pawl 76 is drivingly connected with, and in this instance pivotally carried at 78 by, the spring 62 intermediate its ends. The pawl 76 has in this instance two acting ends 80 and 82 which alternately cooperate with the teeth 84 of the ratchetwheel 74. Thus, it follows that the inclined flanks 86 of the ratchet teeth will alternately cam the ends 80 and 82 of the pawl 76 out of the way when the ratchetwheel 74 turns anticlockwise, i.e., when the same is driven by the rotor 14 on its normal clockwise run (FIGS. 1, 3 and 4), but the radial flank 88 of the ratchet tooth in the path of either pawl end will become locked with the latter when the ratchetwheel 74 turns in the opposite direction, i.e., clockwise as viewed in FIGS. 1, 3 and 4 which directionwise corresponds to wrong-directional anticlockwise rotation of the rotor 14.

The present directional drive control 60 will reliably perform under any kind of motor load on the output pinion 16, and will perform with particular advantage under a motor load which backs up when not driven, such as certain timers, for example, which are spring-loaded and required to be kept spring-loaded by their driving motors. Assuming now that the motor load is of back-up type and the motor is running in normal direction as indicated by the arrows 90, 92 and 94 in FIG. 1, the gear train 18 will, on deenergization of the field coil 28, reverse under the backing load on the output pinion 16, with the ratchetwheel 74 immediately running into interlock with the pawl 76 on spring 62 and then flexing the spring to the extent to which the same will yield to the backing motor load. In this connection, it is a feature of the spring 62 that its length 70 is resiliently flexible under a load preferably in excess of the motor load. Accordingly, on deenergizing the field coil 28 shortly after the rotor 14 passes through the exemplary position shown in FIG. 1, the radial flank 88 of one of the ratchet teeth 84 will, on the back-up of the motor load, run against one end of the pawl 76, in this instance its end 80, whereupon the backing load will, through intermediation of the gear 54 and pinion 52, drive the locked clutch elements 74, 76 clockwise (FIG. 1) until the spring 62 is resiliently flexed to an extent at which it balances the motor load (FIG. 3). The drive control 60 and rotor 14 will thus come to the exemplary rest or idle position in FIG. 3.

Let it now be assumed that the field coil 28 is reenergized, the rotor 14 will then become immediately unstable and vibrate in characteristic fashion until taking off from its repose position in FIG. 3 in whichever direction it develops a predominant urge to go. The rotor will thus respond to reenergization of the field coil with particular rapidity and urgency until taking off in either direction because it then encounters no load since the motor load is counterbalanced by the flexed spring 62. Assuming now that the rotor 14 takes off in the correct, clockwise, direction (FIG. 3), the same will momentarily encounter no load, and will assume the motor load only as gradually as it is transferred to it by the gradually recovering spring 62 on the drive by the combined rotor and spring torque of the clutch elements 74, 76 in counter-clockwise direction (FIG. 3). Thus, the spring 62 will throughout recovery to its normal non-flexed state (FIG. 1) assist the rotor in driving the load, with the torque of the spring being at first so high as to drive nearly the entire load and reducing so gradually throughout recovery of the spring that the rotor will have negligible load impediment in striving toward stable running condition and will more often than not furnish the balance of torque required to maintain the drive of the load as the spring torque decreases. The conditions for immediate forward drive of the motor load on a right-directional start of the rotor are thus excellent. The chances of an immediate load drive on a right-directional start of the rotor are, of course, enhanced by the arrangement of the drive control 60 one or more reduction stages, and preferably one reduction stage, removed from the rotor 14, which during recovery of the spring 62 compels the rotor to step through an angle which is a multiple of that of the one-way clutch 64 and thus brings the rotor poles advantageously opposite an optimum number of field poles 30, 32 while the spring still assists the rotor in the drive of the load. The rotor 14 is thus given every opportunity to reach stable running condition while the spring still assists in the drive of the load. The chances of an immediate load drive on a right-directional start of the rotor 14 are even further enhanced by arranging the spring 62 so that its deflection angle on the back-up of the motor load is relatively large, which compels the rotor to respond by even greater angular displacement to the subsequent recovery of the spring. This is achieved, in the present instance, by selecting a relatively large spring which by virtue of its present fixed arrangement is neither limited in size by the dimensions of, nor presents any problem in its anchorage out of interference with, any moving motor parts. In particular, the flexible length 70 of the present spring 62, by extending away from the clutch element 76, has in its length no limitations save its anchorage 66 to the field plate 20 within its peripheral confines.

Let it now be assumed that on reenergization of the field coil 28 the rotor 14 will take off from its exemplary repose position in FIG. 3 in the wrong, anti-clockwise, direction in which the spring 62 will be flexed even further. This may well happen since, as explained before, the rotor will respond to reenergization of the field coil by becoming unstable and taking off equally readily in either direction because it then encounters no load. Furthermore, due to the speed-reduction between the rotor 14 and the one-way clutch 64, the rotor may well travel far enough in the wrong direction to reach sufficiently stable running condition to drive the initially confronting load which is then but a small part of the motor load since the same is at this stage still largely counterbalanced by the flexed spring 62. Thus, the rotor 14 may have ample opportunity to develop sufficient running torque for driving the load which is of briefly rapidly and then more slowly increasing magnitude and consists of the motor load on the output pinion 16 and the rotor-opposing force of the increasingly flexed spring 62. At any rate, when the rotor 14 has on its start in the wrong direction reached stable running condition, its running torque will increase with the increasing load and drive the latter until it reaches stalling torque, whereupon the rotor and the motor load will reverse and run in the opposite, right, direction with powerful assistance from the flexed spring. Thus, in accordance with an important aspect of the present invention, the characteristics of the spring 62 may be, and preferably are, such that on a wrong-directional drive of the rotor 14 the spring length 70 will respond to increasing rotor torque up to stalling torque by proportionately increasing resilient flexure. The spring 62 may thus be resiliently flexed until the rotor reaches stalling torque in the exemplary position of FIG. 4 and, hence, will come to a stop in this position. However, the stop of the rotor is but for an instant, for the full force of the flexed spring 62 exerts itself immediately to reverse the rotor with the entire motor load, and the rotor will certainly have reached stable running condition, and hence could drive the entire load, when forced to assume the motor load gradually as the spring recovers beyond its momentary flexure in FIG. 3 to its non-flexed state (FIG. 1).

With this arrangement of the drive control 60, the rotor will, on each reenergization of the field coil 28, assuredly start instantaneously in either direction and almost immediately drive the motor load in the right direction. Moreover, the rotor will as assuredly self-start and drive an even exceptionally heavy motor load which for its drive may require exceptionally high rotor torque below, but not too far from, its stalling torque. Thus, if the rotor starts in the right direction and should under its load reverse before reaching stable running condition, the torque of the spring 62 alone would on the next reversal of the rotor into the correct drive direction (FIG. 4) assuredly overpower and drive the motor load until the rotor quickly reaches stable running condition at which time there would be available, were it needed, for the continued drive of the load an astonishing overall driving force consisting of the then hardly dissipated spring torque and the full running torque of the rotor, and their combined torques would then be nearly twice the running torque of the rotor. There is thus available reserve driving power which is more than adequate to drive even the heaviest motor load until the rotor alone assumes the drive. Also, despite the large driving force of the spring 62 on its flexure at rotor-stalling torque (FIG. 4), which may well tend unduly to accelerate the motor load on its reversal and initial drive in the right direction, the rotor 14 will prevent such undue load acceleration and, in fact, regulate the effective torque for the load drive, as long as the spring force has load-accelerating tendencies, for the rotor, when quickly reaching stable running condition, will develop torque which will oppose the spring force to the extent that the same tends to accelerate the load beyond the speed now dictated by the rotor even before the same solely assumes the drive of the load. Accordingly, while on a right-directional start of the rotor and its successful, and hence quick, attainment of stable running condition the motor load will as quickly reach normal drive speed, the motor load will reach normal drive speed equally quickly on reversal of the rotor after a wrong-directional start.

The present motor drive control 60, while highly advantageous and unique in its performance as already described, is also of exceedingly simple construction and lends itself to highly efficient and low-cost mass production and assembly. Thus, the ratchetwheel and pawl elements 74, 76 of the one-way clutch 64 may simply be blanked from stock, and the spring 62 may be of exceeding simplicity, and the facile assembly of these parts in a motor is self-evident. The present motor drive control also permits the drive 18 between the rotor 14 and output pinion 16 to be positive throughout with the aforementioned advantage. Also, while in the exemplary motor 10 as shown and described the drive control 60 is advantageously removed from the rotor 14 by one reduction stage of the gear train 18, it is fully within the purview of the present invention to place the drive control at the rotor if this should be desired for some reason. Furthermore, the drive control may be connected with the rotor by reduction gearing which may be separate from the gear train 18 if this should be desired for some reason.

The removal of the drive control from the rotor by at least one reduction stage is, of course, preferred due to the advantageous large angular displacement response of the rotor to the flexure of the spring within its operating range, and this large angular displacement response of the rotor is even enhanced by proper selection of the spring characteristics, as explained. Thus, angular displacement of the rotor on flexing the spring to its maximum operational flexure at rotor-stalling torque is preferably in excess of 180 degrees, and it is well within the design of the exemplary drive control 60 to attain angular rotor displacement to that extent and even well over 360 degrees, as desired.

In order that the spring 62 may respond in operational resilient flexure to rotor torque up to stalling torque, the spring must obviously be resiliently flexible beyond its flexure at rotor-stalling torque. Under the circumstances, there is preferably provided on the field plate 20 a stop 96 against which a part of the drive control 60, in this instance the spring 62, backs for limiting flexure of the spring beyond its flexure at rotor-stalling torque, thereby to prevent, on stopping the motor, excessive back-up of the motor load, particularly when the load is heavy and has considerably inertia on its back-up, as well as to hold the maximum stresses of the spring well below the elastic limit to avoid any possible permanent distortion of the spring. The stop 96 is in this instance an eccentric disc which is secured to the field plate 20 by a screw 98. The stop disc 96 may thus be angularly adjusted on loosening the screw 98 and retightening it in order variably to limit the flexure of the spring beyond its flexure at rotor-stalling torque, or even to limit its flexure to less than that at rotor-stalling torque if desired.

While in the described directional motor drive control 60 the spring 62 thereof is resiliently flexible beyond its flexure at rotor-stalling torque so as resiliently to flex operationally until the rotor reaches stalling torque on a wrong-directional start and drive, it is, of course, fully within the purview of the present invention to use a spring which on a wrong-directional start and drive of the rotor will resiliently flex with increasing rotor torque until the same is in excess of its running torque on the normal drive of a motor load, but which will stiffen and to all intents and purposes act like a rather sudden stop for the rotor in advance of the position which it would reach if the spring were resiliently flexible until the rotor reaches stalling torque. Thus, the spring 62 of FIGS. 1 to 4 may be of that type, in which case it would be at optimum flexure in FIG. 4 with the rotor in the corresponding position, i.e., in advance of the position at which it would stall if the spring were resiliently flexible up to rotor-stalling torque. Such a modified drive control, while not preferred, will nevertheless perform reliably and with most of the aforementioned advantages.

Reference is now had to FIGS. 5 and 6 which shows a motor 10a with a modified drive control 60a that has all the advantages of and functions as the described drive control 60 of FIGS. 1 to 4. In fact, the present drive control 60a is like the described drive control 60 except that the parts of the one-way clutch 64a are different. Thus, one element of the one way clutch 64a is formed by one or more depending pins 100 on the gear 48a of the train 18a, while the other clutch element is in the form of an integral action arm 102 on the spring 62a. Thus, on a right-directional start and drive of the rotor 14a, clockwise as viewed in FIG. 5, the gear 48a will be driven in the opposite, anticlockwise, direction, with the pins 100 camming an upwardly inclined endlength 104 of the action arm 102 downwardly and out of their path every time they pass the same. The action arm 102 is thus resiliently flexible sufficiently to yield to the passing pins 100. However, and as shown, the action arm 102 is of considerable width w, sufficiently so that the same acts like a stiff arm when on a wrong-directional start of the rotor 14a the pin 100 nearest the free end 106 of the arm engages this arm end in its path and transmits the rotor torque to the spring for resilient flexure of its length 70a until the rotor reaches stalling torque (FIG. 6). The action arm 102 presently extends circularly about the axis y of the gear 48a and is preferably of considerable arcuate extent, at least over 180 degrees, and presently over and beyond 270 degrees, for its ready yieldability to the pins 100 on the normal drive of the rotor and its load.

Reference is now had to FIG. 7 which shows a motor 10b with another modified directional drive control 60b. This drive control also performs like the described drive control 60 of FIGS. 1 to 4 and is structurally like the same with the exception of the clutch element 76b and the spring 62b. Thus, the clutch element 76b is a pawl which is floatingly pivotally mounted on the field plate 20b by having a slot 110 into which projects a pin 112 on the field plate. The other clutch element, i.e., the ratchetwheel 74b, is drivingly connected with the rotor 14b in the same manner in which the ratchetwheel 74 is connected with the rotor 14 in FIG. 1. The spring 62b is a straight leaf anchored in cantilever fashion at 114 to a lug 116 which is conveniently struck-up from the field plate 20b. Instead of using a separate spring to hold the pawl 76b in cooperative relation with the ratchetwheel 74b, the drive control spring 62b is used for this purpose. To this end, the spring 62b in substantially non-flexed condition holds the pawl 76b at the end 118 of its floating pivot mount on the field plate 20b, with the spring-engaging back face 120 of the pawl being plane so as to have a cam action with the spring 62b for the return of the active pawl end 122 against the ratchetwheel 74b every time it is cammed out of the way by the ratchet teeth 84b on the normal rotor-drive of the ratchetwheel in anticlockwise direction.

The motor 10b is shown in normal running condition for in its idle condition the motor load backs up against and flexes the spring 62b through intermediation of the one-way clutch 64b. Keeping this in mind, it will by now be readily understood without further explanation that the present drive control 60b performs exactly like the described drive control 60 of FIGS. 1 to 4. Also, the slot 110 in the pawl 76b may be made of such length that its other end 124 rests against the pin 112 to limit, if need be, flexure of the spring 62b beyond its flexure at rotor-stalling torque on the back-up of the motor load.

Reference is next had to FIG. 8 which shows a motor 10c with a further modified directional drive control 60c which differs from the previously described drive controls by having the control spring 62c interposed between the rotor-driven gear 48c and the one-way clutch 64c, which also requires a one-way coupling 130 between the gear 48c and its associated ratchetwheel element 74c of the one-way clutch 64c. The one-way coupling 130 is formed in this instance by an arcuate slot 132 in the gear 48c and a pin 134 on the ratchetwheel 74c which projects into the slot 132, with the end 136 of the slot 132 engaging the pin 134 and driving the ratchetwheel 74c in a counterclockwise direction on the normal drive of the rotor 14c in clockwise direction, as will be readily understood. The other, pawl element 76c of the one-way clutch, which is pivoted at 138 on the field plate 20c and normally yieldingly retained in cooperative relation with the ratchetwheel 74c by a spring 140, will on the normal drive of the ratchetwheel 74c by the rotor 14c via the rotor pinion 46c, gear 48c and the one-way coupling 130, simply override the ratchet teeth 84c.

The spring 62c, which like the springs of the other forms of the drive control takes no part in the normal motor drive, is in this instance carried by the gear 48c and drivingly connected with the ratchet wheel 74c by being anchored at 142 to the gear 48c and extending with the free end of its flexible length 70c into engagement with the pin 134 on the side thereof opposite to that engaged by the slot end 136 on the normal motor drive. The spring length 70c is preferably non-flexed, or at the most inappreciably flexed, on the normal motor drive.

The motor is shown in normal drive condition since in its idle condition the motor load will back against the spring 62c and flex the same. Assuming now that the field is deenergized, the load on the output shaft 56c will back up and through intermediation of gear 54c and pinion 52c drive gear 48c clockwise, with the spring 62c driving the ratchetwheel 74c in the same direction until the same becomes soon locked to the pawl 76c against further clockwise rotation with the gear 48c. However, the backing motor load will continue the clockwise drive of the gear 48c relative to the locked ratchetwheel 74c in the course of which the spring 62c will be gradually flexed until its force counterbalances the motor load at which time the pin 134 is intermediate the ends of the slot 132. Assuming now that on reenergization of the field the rotor 14c will start in the right, clockwise direction, the flexed spring 62c will assist the rotor in driving the load until the end 136 of the slot 132 in the then counterclockwise driven gear 48c engages the pin 134 at which time the rotor assumes the drive of the entire motor load. However, if the rotor should on reenergization of the field start in the wrong, counterclockwise direction, the then correspondingly clockwise driven gear 48c will back with the end 136 of its slot 132 further away from the pin 134 on the locked ratchetwheel 74c with the result that the spring 62c will be further flexed beyond its flexure at counterbalancing the motor load until the rotor reaches stalling torque, at which time the pin 134 is near, but still spaced from, the other end 144 of the slot 132, and the rotor and its load will be immediately reversed and driven in the right direction by the powerful force of the flexed spring 62c, with the rotor quickly reaching stable running condition so as assuredly to assume the drive of the load as the recovering spring assists less and less in its drive and finally ceases to assist in its drive altogether. The arcuate length of the slot 132 may also be selected to limit on the back-up of a particular motor load possible flexure of the spring 62c beyond that at rotor-stalling torque, with the slot end 144 and pin 134 then cooperating to thus limit spring flexure.

Figure 10:
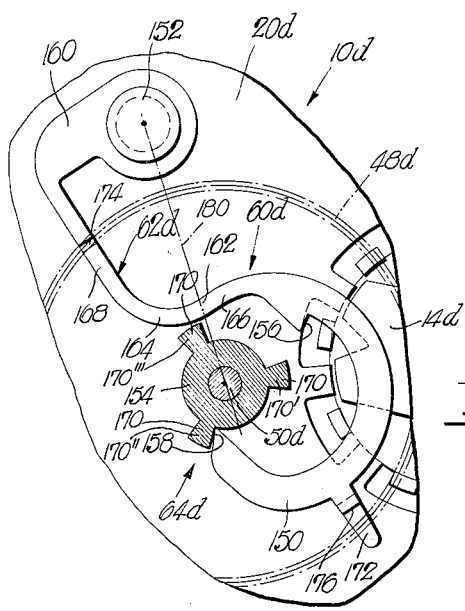
FIG. 10 is a fragmentary section showing certain parts of the modified motor of FIG. 9 in different operating positions.

Reference is finally had to FIGS. 9 and 10 which show a motor 10d with a modified drive control 60d that is similar to the drive control 60a of FIG. 5 in that in the present control 60d one of the elements of the one-way clutch 64d is also an integral part or action arm 150 of the spring element 62d. However, the present drive control 60d differs significantly from the previous control 60a in that the entire spring 62d, including its action arm 150, is freely swung back and forth on the field plate 20d by the other clutch element 154 on the normal drive of the rotor 14d in counterclockwise direction (FIG. 9).

The spring element 62d, which is of S-like configuration, is with one end pivoted on a stud 152 on the field plate 20d and the larger part of its end lobe remote from the pivot support 152 forms the action arm 150 which is provided with opposite action shoulders 156, 158 and a finger 172. The action arm 150 as well as a preferably straight endlength 160 of the spring element 62d are operationally non-flexible and are to this end made of greater width than the operationally flexible part or length 162 of the spring element. This flexible spring length 162 has in this instance a relatively widely curved intermediate part 164 and linearly continuing end parts 166 and 168 which, in turn, are continuous with the non-flexible action arm 150 and straight endlength 160, respectively, of the spring element. The clutch element 154, which is carried by the shaft 50d that also carries the gear 48d of the train 18d, is in the exemplary form of a disc having on its periphery several, in this instance three, equiangularly spaced tooth formations 170. The pivoted end 160 of the spring element 62d and the finger 172 on its action arm 150, which in this instance rest on the field plate 20d, are at 174 and 176 struck into slight offset from the rest of spring element so that the entire action arm 150 and most of the flexible part 162 of this element are slightly spaced from the field plate 20d, whereby the shoulders 156 and 158 will be in unfailing cooperative relation with the teeth 170 of the clutch element 154 and the spring element will on its operational swinging motions on the normal drive of the rotor encounter inappreciable friction at the most from this field plate.

Assuming now that the rotor 14d is driven in its normal counterclockwise direction in which the clutch element 154 is driven in clockwise direction (FIG. 9), the tooth 170' on this clutch element has in the momentary angular position in FIG. 9 just cooperated with the shoulder 156 on the spring element 62d in camming the latter to the right limit of its operational swinging range at which its other shoulder 158 is in the path of the next approaching tooth 170'' which shortly after the tooth 170' clears the shoulder 156 will cooperate with the shoulder 158 in camming the spring element to the left limit of its operational swinging range, as will be readily understood. With the tooth 170'' then camming the spring element 62d to the left limit of its operational swinging range, its shoulder 156 is brought into the path of the next approaching tooth 170''' which will cam the spring element back to the right limit of its operational swinging range after the tooth 170'' has cleared the shoulder 158. The teeth 170 on the clutch element 154 thus alternate in camming the spring element 62d back and forth over its swinging range during normal rotor drive.

Assuming now that the field coil of this motor is deenergized and the rotor 14d coasts to a momentary stop in the exemplary position in FIG. 9, the load on the rotor will immediately back the clutch element 154 with its tooth 170''' against the shoulder 158 of the spring element 62d and resiliently flex the latter until it balances the entire motor load (FIG. 10). With the rotor load thus backing against the shoulder 158 on the spring element 62d through the exemplary intermediation of the tooth 170''' of the clutch element 154, the spring element will be elongated along the dot-and-dash line 180 through its pivot axis and point of engagement of its shoulder 158 with the tooth 170''' (FIG. 10), with the spring element being thus elongated by resilient flexure of its length 162 and especially of the curved part 164 thereof. If on deenergization of the field coil of the present motor the rotor 14d should coast to a momentary stop in an angular position in which the motor load will, through intermediation of one of the teeth 170 on the clutch element 154, back-up against the other shoulder 156 on the spring element, the back-up load will cause flexure of the spring length 162 of like extent but oppositely as before due to operational shortening of the spring element along a line passing through its pivot axis and the point of engagement of its shoulder 156 with the respective tooth 170 of the clutch element 154, as will be readily understood. The shoulders 156 and 158 on the spring element 62d and the active flanks of the teeth 170 on the clutch element 154 are so inclined to each other that on any back-up of the rotor load, be it on stoppage of the motor or on a self-start of the rotor, the particular acting tooth 170 will cam the cooperating shoulder on the spring element against the periphery of the disc element 154 so as to lock the spring element against snapping from the acting tooth 170. The present drive control acts on a wrong-directional start of the rotor like the previously described controls, in that the particular acting tooth 170 of the clutch element 154 transmits the rotor torque to the spring element for resilient flexure of its part 162 until the rotor reaches stalling torque.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous motor, the combination with a field structure including a coil, and a permanent-magnet rotor starting and running in either direction on energization of said coil, of a directional drive control having a first rotor-driven member with a rotary axis, a second fixed member, a one-way clutch having two companion elements of which a first element is turnable about said axis and the second element locks said first element against rotation in one direction relative to said second element, with said first member and first element constituting the parts of a first unit and said second member and second element constituting the parts of a second unit, of which one part of one of said units is turnable relative to the other part thereof about said axis and the parts of the other unit are non-turnable relative to each other about said axis, and a spring relative to each other about said axis, and a spring operatively connecting the parts of said one unit and yieldingly opposing rotation of said one part relative to said other part in said one direction, with the normal rotor drive of said first member being in the opposite direction; and a motor load of back-up type applied to the rotor via said first member, whereby in idle condition of the rotor said first element is backed into said locked relation with said second element by said motor load, with said spring being arranged to have adequate resiliency for deflection into exact counterbalance with said motor load in idle condition of the rotor so that on reenergization of said coil the rotor encounters no load in any repose position.

2. The combination in a synchronous motor as set forth in claim 1, in which said spring is arranged to have adequate resiliency for deflection into exact counter-balance with said motor load in idle condition of the rotor, and for further deflection on a wrong-directional start of the rotor until the latter reaches stalling torque substantially of the magnitude in normal running, so that on reenergization of said coil the rotor encounters no load in any repose position and the rotor reverses on a wrong-directional start without rebound and under the maximum force of said spring.

3. In a synchronous motor, the combination with a field structure including a coil, and a permanent-magnet rotor starting and running in either direction on energization of said coil, of a directional drive control having a spring carried by said field structure and a one-way clutch having first and second companion elements drivingly connected with said rotor and spring, respectively, and when drivingly engaged with each other being drivers for each other on their rotation in first and second opposite directions, respectively, with said elements being disengaged on the normal rotor drive of said first element in said second direction; and a motor load of back-up type applied to the rotor via said first element, whereby in idle condition of the rotor said first element is backed into driving engagement with said second element, with said spring being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

4. The combination in a synchronous motor as set forth in claim 3, in which said spring is further arranged to be deflectable beyond said deflection on a wrong-directional rotor start, and there is further provided a stop on said field structure for limiting deflection of said spring beyond said deflection on a wrong-directional rotor start.

5. The combination in a synchronous motor as set forth in claim 4, in which said stop is adjustable.

6. In a synchronous motor, the combination with a field structure including a coil, and a permanent-magnet rotor starting and running in either direction on energization of said coil, of a directional drive control having a spring carried by said field structure, a one-way clutch having first and second companion elements of which said second element is drivingly connected with said spring, and a speed-reduction drive between said rotor and first element with the rotor having the higher speed, said first and second elements being, when drivingly engaged with each other, drivers for each other on their rotation in first and second opposite directions, respectively, with said elements being disengaged on the normal rotor drive of said first element in said second direction; and a motor load of back-up type applied to the rotor via said first element, whereby in idle condition of the rotor said first element is backed into driving engagement with said second element, with said spring being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

7. The combination in a synchronous motor as set forth in claim 6, in which said spring is arranged so that on said deflection thereof on a wrong-directional rotor start the rotor is displaced in excess of 180 degrees.

8. In a synchronous motor, the combination with a field structure including a coil, a permanent-magnet rotor starting and running in either direction on energization of said coil, a shaft, and a speed-reduction drive between said rotor and shaft including a driven part, with the rotor having the higher speed, of a directional drive control having a spring carried by said field structure and a one-way clutch having first and second companion elements drivingly connected with said part and spring, respectively, and when drivingly engaged with each other being drivers for each other on their rotation in first and second opposite directions, respectively, with said elements being disengaged on the normal rotor drive of said part in said second direction; and a motor load of backup type applied to said shaft, whereby in idle condition of the rotor said first element is backed into driving engagement with said second element, with said spring being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

9. In a synchronous motor, the combination with a field structure including a coil, and a permanent-magnet rotor starting and running in either direction on energization of said coil, of a directional drive control having a spring carried by said field structure and a one-way clutch having a ratchetwheel element and a companion pawl element of which a first element is drivingly connected with said rotor and the second element with said spring, with said first and second elements being, when drivingly engaged with each other, drivers for each other on their rotation in first and second opposite directions, respectively, and said elements being disengaged on the normal rotor drive of said first element in said second direction; and a motor load of back-up type applied to the rotor via said first element, whereby in idle condition of the rotor said first element is backed into driving engagement with said second element, with said spring being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

10. The combination in a synchronous motor as set forth in claim 9, in which said first and second elements are said ratchetwheel and pawl elements, respectively, said spring is a leaf of longitudinal extent anchored with one end to the field structure and pivoted with its other end about the axis of said ratchetwheel element and being resiliently flexible intermediate its ends, and said pawl element is pivotally carried by said spring intermediate its ends.

11. The combination in a synchronous motor as set forth in claim 9, in which said first and second elements are said ratchetwheel and pawl elements, respectively, said spring is a straight leaf anchored with one end to the field structure, and said pawl element is floatingly pivotally mounted on the field structure and normally held by the free end of said spring substantially at that end of its floating pivot mount from which it will be moved on the rotor-drive of said ratchetwheel element in said first direction.

12. The combination in a synchronous motor as set forth in claim 9, in which said first and second elements are said rachetwheel and pawl elements, respectively, said spring is a straight leaf anchored with one end of the field structure, and said pawl element has a flat back face and is floatingly pivotally mounted on the field structure and normally engaged at its flat face by the free end of the spring so as to be held substantially at that end of its floating pivot mount from which it will be moved on the rotor-drive of said ratchetwheel element in said first direction, with the engaged pawl face and spring end also acting to urge the pawl element against the ratchetwheel element.

13. The combination in a synchronous motor as set forth in claim 9, in which said first and second elements are said ratchewheel and pawl elements, respectively, said spring is a straight leaf anchored with one end to the field structure, and said pawl element is floatingly pivotally mounted on the field structure and normally held by the free end of said spring substantially at that end of its floating pivot mount from which it will be moved on the rotor-drive of said ratchetwheel element in said first direction, with the other end of the floating pivot mount of the pawl element serving as a stop for the latter to limit deflection of said spring beyond said deflection thereof on a wrong-directional rotor start.

14. In a synchronous motor, the combination with a field structure including a coil, and a permanent magnet rotor starting and running in either direction on energization of said coil, of a directional drive control having a rotor-driven member with a shoulder, a spring leaf of longitudinal extent anchored with one end to the field structure and pivoted with its other end about the rotary axis of said member and being resiliently flexible over a length intermediate it ends, said leaf having intermediate its ends an integral arm extending circularly about said axis and being with its free end in the path of said shoulder on rotation of said member in one direction, with said arm being cross-sectionally dimensioned to yield to said shoulder on the normal rotor drive of said member in the other direction and be substantially non-yielding when driven by said shoulder to flex said leaf length on rotation of said member in said one direction; and a motor load of back-up type applied to the rotor via said member, whereby in idle condition of the rotor said member is with said shoulder thereof backed against the free end of said arm, with said flexible leaf length being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

15. In a synchronous motor, the combination with a field structure including a coil, and a permanent-magnet rotor starting and running in either direction on energization of said coil, of a directional drive control having a rotor-driven member with a rotary axis, a one-way clutch having companion elements of which one element is coaxial with said member and turnable in either direction and the other element is non-turnable about said axis and locks said one element against rotation in one direction, a one-way coupling between said one element and member for driving said one element in the other direction on rotation of said member in the same direction, with said one element and member constituting the parts of a unit, and a spring carried by one part and drivingly connected with the other part of said unit and yieldingly opposing rotation of said member in said one direction relative to said one element; and a motor load of back-up type applied to the rotor via said member, whereby in idle condition of the rotor said one element is backed into locked relation with said other element, with said spring being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

16. The combination in a synchronous motor as set forth in claim 15, in which said one-way coupling comprises an arcuate slot in a first part of said unit and a pin on the second part thereof and projecting into said slot, with said pin being engaged with one end of said slot on the normal rotor drive of said member in a direction opposite to said one direction, and said pin being engaged with the other end of said slot when said spring is deflected to a predetermined extent beyond said deflection thereof on a wrong-directional rotor start.

17. In a synchronous motor, the combination with a field structure including a coil, and a permanent-magnet rotor starting and running in either direction on energization of said coil, of a directional drive control having a member rotor-driven about a first axis and provided with a tooth on its periphery, a metal leaf having opposed lobe parts of substantial S-shape and being pivoted with the free end of one of said lobe parts on said field structure about an axis parallel to said first axis, said one lobe part and the other lobe part being operationally flexible and inflexible, respectively, and said other lobe part partially surrounding said member and having on opposite sides of a plane coincident with said axes two shoulders facing toward and away from said pivot axis, respectively, and being so spaced from each other that either shoulder is in the path of said tooth on rotation of said member in one direction and said tooth swings said leaf back and forth about its pivot axis by camming said shoulders out of its path on the normal rotor drive of said member in the opposite direction; and a motor load of back-up type applied to the rotor via said member, whereby in idle condition of the rotor said member is with said tooth thereof backed against one of said shoulders of said other lobe part, with said flexible lobe part being arranged to have adequate resiliency for deflection into exact counterbalance with said motor load in idle condition of the rotor and for further deflection on a wrong-directional start of the rotor, so that on reenergization of said coil the rotor encounters no load in any repose position and the rotor reverses on a wrong-directional start substantially without rebound and under the maximum force of said spring.

18. The combination in a synchronous motor as set forth in claim 17, in which said leaf is flat, and said one and other lobe parts are operationally flexible and inflexible by being of smaller and larger widths, respectively.

References Cited by the Examiner
UNITED STATES PATENTS

| | | | |
|---|---|---|---|
| 2,625,051 | 1/53 | Kriseman | 74—526 |
| 2,633,950 | 4/53 | Phaneuf | 310—41 |
| 2,661,941 | 12/53 | Smith | 74—526 |
| 2,766,863 | 10/56 | Berg | 310—41 |
| 2,788,455 | 4/57 | Kohlhagen | 310—41 |
| 3,027,469 | 3/62 | Sidell | 310—162 |

ORIS L. RADER, *Primary Examiner.*

MILTON O. HIRSHFIELD, *Examiner.*